June 1, 1926.

R. S. CROSBY 1,587,011

TOOL SUPPORT FOR METAL CUTTING MACHINES

Filed Sept. 21, 1922

INVENTOR
Reuben S. Crosby.
by
Arthur Jenkins,
ATTORNEY.

Patented June 1, 1926.

1,587,011

UNITED STATES PATENT OFFICE.

REUBEN S. CROSBY, OF HARTFORD, CONNECTICUT, ASSIGNOR TO THE ASA S. COOK COMPANY, OF HARTFORD, CONNECTICUT, A CORPORATION OF CONNECTICUT.

TOOL SUPPORT FOR METAL-CUTTING MACHINES.

Application filed September 21, 1922. Serial No. 589,595.

My invention relates to the class of devices employed for holding tools for cutting operations upon articles usually movably supported with respect to such tools, and an object of the invention, among others, is to provide a tool holder of this class in which extreme accuracy is not required in grinding the tool, for any series of operations, the device possessing means whereby the tool may be set to provide the proper cutting angle; and another object of the invention is to provide a tool in the use of which the results as to finish shall be of a high grade.

One form of device embodying my invention and in the construction and use of which the objects herein set out, as well as others, may be attained, is illustrated in the accompanying drawings, in which—

In the accompanying drawings the numeral 5 indicates a portion of the frame of a metal cutting machine, the special type herein shown being for shaving the heads of bolts, such machine comprising a spindle having a chuck 6 in which a bolt 7 is clamped for cutting operations of the tools, a back rest 8 being provided for the bolt during such cutting operation.

Figure 2:
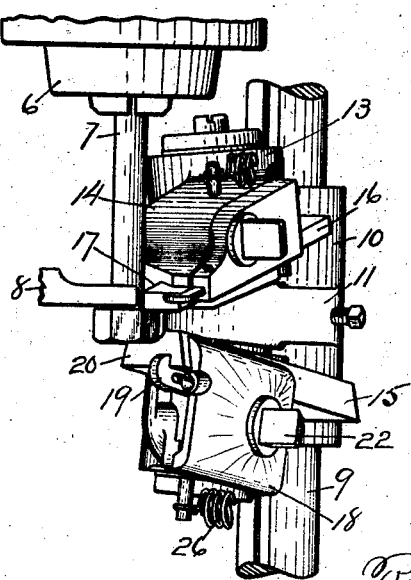
Figure 2 is a view similar to Figure 1, but showing my improved tool support as viewed from the top, the tool actuating mechanism being removed.
Figure 3:
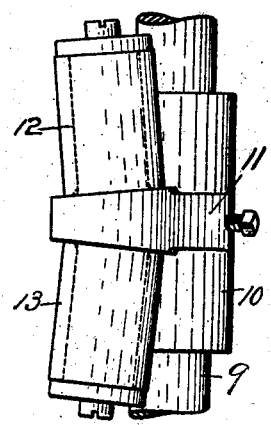
Figure 3 is a detail view illustrating the construction and arrangement of the tool supporting arbor and sleeve.

In carrying my invention into effect I provide a tool supporting arbor 9 that is secured in portions of the frame of the machine in any suitable manner, this arbor being preferably rotatably adjustable. A tool supporting sleeve 10 is mounted on the arbor 9 and is preferably rotatably adjustable therewith. A tool supporting arm 11 rises from the tool supporting sleeve, and this arm supports a tool post arbor 12, in the form of device herein illustrated and described there being an arbor 12 located on each side of the arm 11. These arbors are angularly arranged with respect to the axis of the chuck and also to the arbor 9, as clearly illustrated in Figures 2 and 3 of the drawings. A tool post sleeve 13 is rotatably mounted on each of the tool post arbors 12, and a tool post or holder 14 extends laterally from each tool post sleeve.

Any suitable means may be employed for securing cutting tools 15—16 to the tool posts, as illustrated herein such means comprising a groove 17 in each post closed by a clamping cap 18 for securing the tool in place. Either or both of the tools may have a stop 19 adjustably secured to the tool holder and for the purpose of locating the end of the cutting tool in proper position.

In the cutting of articles of this class, as is well understood, the end 20 of each tool is formed at a certain angle with respect to the work being operated upon, this angle being formed by grinding, and it is essential to proper operation that the surface comprising the end of the tool shall be properly positioned with respect to the work being operated upon. When this angle is determined by grinding the tool much skill is required in such grinding. By the use of my improved device I have avoided the requirement for accuracy in this respect by supporting the holder so that it may be swung on two axes, to wit: the axis of the arbor 9, when the latter is loosened, and the axis of the arbor 12, which latter may be termed "an angle determining axis". By thus arranging the parts the tool may be ground to approximately the form desired, accuracy, however, not being required, as this accuracy may be obtained when the tool is placed in the tool holder by swinging the arm 11 on the axis of the arbor 9, in either direction, as the conditions may require, the point of the tool remaining in contact with the work and the structure breaking at the joint of which the arbor 12 forms a part, it being understood that the arbor 9 has been loosened for this purpose. By this means the end 20 of the tool may be located at the proper angle with respect to the work being operated upon and when so located the arbor 9 may be secured in place, and the axis of the arbor 9 may, therefore, be termed a "tool positioning axis". If required the tool may also be adjusted as to its position lengthwise of the groove 17.

A material advantage is gained by arranging the tool holders so that they swing on the inclined axis hereinbefore described in that the tools, as they are swung toward the work on the axis of the arbor 12, move in an inclined path with respect to the axis of the work so that when a tool is employed, as in the present case, to shave the head of a bolt, the tool moves in such inclined path toward the bolt to effect its cutting action, and as soon as the cutting action is completed and the tool moves back it immediately leaves the surface upon which it had been operating and such surface is, therefore, maintained in a practically finished condition without marks which would be left should the tool move along such cutting surface, as in the case of a tool that moves forward and backward at right angles to the axis of the work.

Figure 1:
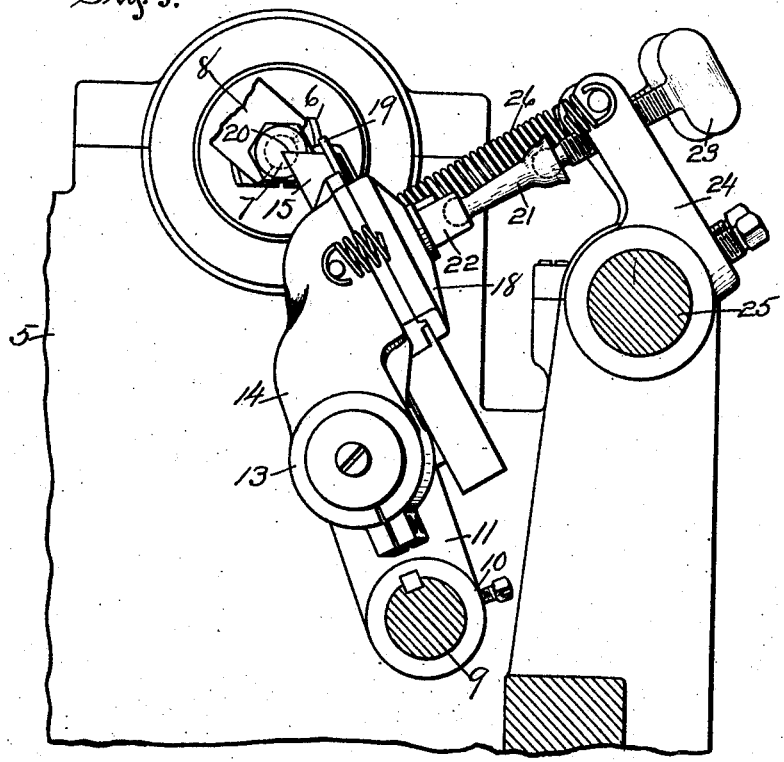
Figure 1 is a view of a portion of a machine equipped with my improved tool support, the latter being shown in side elevation.

In effecting the movements of the tool toward and from the work a strut 21 is engaged within a socket on a stud 22 on the tool holder, an adjusting screw 23 engaging within a socket in the end of the strut. The screw 23 fits a screw threaded hole in a tool actuating arm 24 secured to a tool actuating spindle 25 that may have a partial rotation to and fro imparted to it by means of an arm and cam not herein shown, as the construction and operation of such will be readily understood. The strut 21 is yieldingly held in place as by means of a spring 26 secured at the end of the arm 24 and also to a stud upon the tool post 14, as shown in Figure 1 of the drawings.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A tool support for metal cutting machines, said support comprising a member rotatably adjustable on a tool positioning axis, a tool post mounted in an inclined position on an inclined angle determining axis on said member, and rotatably adjustable thereon, and means for securing a tool to said post.

2. A tool support for metal cutting machines, said support comprising a member rotatably adjustable, a tool post adjustably rotatably mounted on an axis inclined with respect to the axis of said member, and means for securing a tool to said post.

3. A tool support for metal cutting machines, said support comprising a member rotatably adjustable, a stud projecting from said member at an angle to the axis of said member, a tool post rotatably adjustably mounted on said stud, and means for securing a tool in said tool post.

4. In combination with the work spindle of a metal cutting machine, a tool support comprising a member rotatably adjustable on an axis inclined with respect to the axis of said work holding spindle and means for rotatably supporting said member on an axis substantially parallel with said work spindle.

5. A tool support for metal cutting machines, said support comprising a supporting arbor, a sleeve rotatably adjustably supported by said arbor, an arm projecting laterally from said sleeve, a stud projecting at an angle to said arm, a tool post rotatably adjustably mounted on said arm, and means for securing a tool to said tool post.

6. A tool support for metal cutting machines, said support comprising an arbor, a sleeve rotatably adjustably supported by said arbor, an arm projecting laterally from said sleeve, studs projecting laterally from said arm on opposite sides thereof and at an inclined angle thereto, a tool support adjustably mounted on each of said studs, and means for securing a tool to said post.

REUBEN S. CROSBY.